United States Patent
Yue et al.

(10) Patent No.: US 12,130,603 B2
(45) Date of Patent: Oct. 29, 2024

(54) METHOD AND APPARATUS FOR CONTROLLING SMART HOME

(71) Applicants: Gree Electric Appliances, Inc. of Zhuhai, Guangdong (CN); Zhuhai Leayun Technology Co., Ltd, Zhuhai (CN)

(72) Inventors: Dong Yue, Guangdong (CN); ShaoBin Li, Guangdong (CN); Chong Chen, Guangdong (CN); Xiaoyu Luo, Guangdong (CN)

(73) Assignees: Gree Electric Appliances, Inc. of Zhuhai, Zhuhai (CN); Zhuhai Leayun Technology Co., Ltd, Zhuhai (CN)

( * ) Notice: Subject to any disclaimer, the term of this patent is extended or adjusted under 35 U.S.C. 154(b) by 419 days.

(21) Appl. No.: 17/624,152

(22) PCT Filed: Jun. 28, 2020

(86) PCT No.: PCT/CN2020/098388
§ 371 (c)(1),
(2) Date: Dec. 30, 2021

(87) PCT Pub. No.: WO2021/000790
PCT Pub. Date: Jan. 7, 2021

(65) Prior Publication Data
US 2022/0365503 A1    Nov. 17, 2022

(30) Foreign Application Priority Data
Jul. 2, 2019    (CN) .......................... 201910591087.7

(51) Int. Cl.
G05B 23/02    (2006.01)
G05B 19/042   (2006.01)
G06F 17/16    (2006.01)

(52) U.S. Cl.
CPC .... *G05B 19/042* (2013.01); *G05B 2219/2642* (2013.01)

(58) Field of Classification Search
CPC ........................ G05B 19/02; G05B 2019/2642
(Continued)

(56) References Cited

U.S. PATENT DOCUMENTS

2006/0206291 A1    9/2006    Bash et al.
2016/0364963 A1    12/2016   Matsuoka et al.
(Continued)

FOREIGN PATENT DOCUMENTS

CN    101408754 A    4/2009
CN    105068515 A    11/2015
(Continued)

OTHER PUBLICATIONS

International Search Report, with a mailing date of Sep. 29, 2020, in International application No. PCT/CN2020/098388, filed on Jun. 28, 2020 (4 pages).
Priority search reports for application No. CN 2019105910877, filed on Jul. 2, 2019 (2 pages).

*Primary Examiner* — Md Azad
(74) *Attorney, Agent, or Firm* — McAndrews, Held & Malloy, Ltd.

(57) ABSTRACT

Disclosed are a method for controlling smart home and a device for controlling smart home. The method includes the following steps: a demand database and a habit database of a user for home appliances are built; according to the built demand database, demand models of different users are trained by using a neural network, and the demands of the users during different periods of time are predicted; and according to the built habit database and a prediction regarding the demands of the users, a home appliance execution policy conforming to the habits of the users are output by (Continued)

using a probability statistical algorithm, and the corresponding home appliances are controlled in advance.

9 Claims, 2 Drawing Sheets

(58) Field of Classification Search
USPC .......................................................... 700/28
See application file for complete search history.

(56) References Cited

U.S. PATENT DOCUMENTS

2018/0024541 A1* 1/2018 Zhu .................... H04L 12/2803
 700/275
2018/0121797 A1 5/2018 Prabhu et al.
2019/0086890 A1 3/2019 Bradley et al.
2020/0202997 A1* 6/2020 Hadad .................... G16H 50/70
2021/0071401 A1* 3/2021 Shen ..................... G06F 18/214
2021/0225530 A1* 7/2021 Egi ......................... G16Y 20/20

FOREIGN PATENT DOCUMENTS

| | | |
|---|---|---|
| CN | 106322656 A | 1/2017 |
| CN | 107665230 A | 2/2018 |
| CN | 108536030 A | 9/2018 |
| CN | 109344992 A | 2/2019 |
| CN | 109660598 A | 4/2019 |
| CN | 109818839 A | 5/2019 |
| CN | 109947029 A | 6/2019 |
| CN | 110456647 A | 11/2019 |
| IN | 105607508 A | 5/2016 |
| IN | 109491253 A | 3/2019 |

* cited by examiner

METHOD AND APPARATUS FOR CONTROLLING SMART HOME

CROSS-REFERENCE TO RELATED APPLICATION

The present application is a 371 of International Patent Application No. PCT/CN2020/098388, filed Jun. 28, 2020, which claims priority to Chinese Patent Application No. 201910591087.7, filed on Jul. 2, 2019 and entitled "Method and Apparatus for Controlling Smart Home", the disclosure of which is hereby incorporated by reference in its entirety.

TECHNICAL FIELD

The disclosure relates to the technical field of smart home of Internet of Things, and in particular to a method and apparatus for controlling smart home.

BACKGROUND

In traditional home furnishings, a user is the center of a home design, and the decoration, layout and the like in the home are designed according to user preferences. In daily life, the user opens a window, turns on a television, and closes a curtain and the like according to own needs, namely a desired home experience is obtained through physical changes to a home state. With the development of an Internet of Things technology, the concept of thing-thing interconnection profoundly affects the industrial and commercial fields of human society and even the daily life. A smart home technology is an emerging technology that combines the Internet of Things technology and the home design, so that the home is made "live", to serve the user better.

At present, a smart home apparatus is still actively controlled by the user substantially, and the intelligence is not achieved. In order to make a traditional home appliance product more intelligent and understand the user, a new method for controlling smart home needs to be developed to achieve the above purpose.

SUMMARY

The method for controlling smart home of the embodiments of the disclosure includes the following steps.

A demand database and a habit database of a user for home appliances are built.

According to the built demand database, demand models of different users are trained by using a neural network, and the demands of the users during different periods of time are predicted.

According to the built habit database and a prediction regarding the demands of the users, a home appliance execution policy conforming to the habits of the users are output by using a probability statistical algorithm, and the corresponding home appliances are controlled in advance.

In some embodiments, according to the prediction regarding the demands of the users and the built habit database, the optimal home appliance execution policy conforming to the habits of the users is determined by using the probability statistical algorithm, and the corresponding home appliances are controlled in advance, including:

In the case without external intervention, according to a latest indoor air quality standard read after the home appliances are connected to the Internet, it is calculated whether the relevant state content is matched and unmatched state feature and difference value are determined as an algorithm input, and at the same time policy matching is performed in the habit database.

In a case that a corresponding policy exists, the corresponding policy is executed to intelligently control the corresponding home appliances.

In a case that the corresponding policy does not exist, the unmatched state feature is used to obtain a list of the home appliances that may adjust this feature in an existing environment and a state feature change rate of different policies thereof.

The difference value is combined to specify a possible action set A(s) and based on a value iteration function, the optimal policy a* is executed to intelligently control the corresponding home appliances.

In some embodiments, according to the built habit database and the prediction regarding the demands of the users, the optimal home appliance execution policy conforming to the habits of the users is determined by using the probability statistical algorithm, and the corresponding home appliances are controlled in advance, further including:

in the case with the external intervention:

According to obtained user demand information, the unmatched state feature and difference value are determined as the algorithm input.

The unmatched state feature is used to obtain the list of the home appliances that may adjust the state feature in the existing environment and the state feature change rate of the different policies thereof.

The difference value is combined to specify the possible action set A(s) and based on the value iteration function, the optimal policy a* is executed to intelligently control the corresponding home appliances. In some embodiments, according to the prediction regarding the demands of the users and the built habit database, the optimal home appliance execution policy conforming to the habits of the users is determined by using the probability statistical algorithm, and the corresponding home appliances are controlled in advance, further including: it is determined whether the executed policy is matched with the user demand.

In a case that a feedback of actively changing the policy by the user is not received within a period of time, the habit database is refreshed.

In a case that the feedback of actively changing the policy by the user is received, a received new policy is stored in the habit database.

In some embodiments, while the data size in the habit database reaches a certain order of magnitude, the habit database is analyzed by using the probability statistical algorithm to learn a behavior habit $\Gamma$ of the user, and a decision-making recommendation is made for the user based on $\Gamma$.

In some embodiments, the unmatched state feature is used to obtain the list of the home appliances that may adjust the state feature in the existing environment and the state feature change rate of the different policies thereof, including:

A least square method is used to fit operating parameters of the home appliances in the early stage, as to obtain operating curves of the different policies in the corresponding environment.

Derivation is performed on the operating curves to obtain the state feature change rate and it is updated intermittently.

The difference value is combined to specify the possible action set A(s) and based on the value iteration function, the optimal policy a* is output to intelligently control the corresponding home appliances.

In some embodiments, the value iteration function is $U(s)=R(s_0)+\gamma^* \max \Sigma_s P(s'|s_0,a)^*U(s')=R(s_0)+\gamma\square\max[U_a(s')]$, the optimal policy decision depends on state utility $U_a(s')$, herein the continuity of a control variable s with time is:

$$U_a(s') = E\left[\sum_{t=0}^{\infty} \gamma^t * R(s_t)\right] = \frac{1}{t}\int_0^{\gamma} \gamma^t * R(s_t), R(s_t) = \frac{1}{|s'-s_t|}$$

Alternatively, s' is a demand state, $s_t$ is an existing state, $a \in A(s)$, and $\gamma$ is a discount factor.

In some embodiments, the probability statistical algorithm is a Bayesian algorithm.

In some embodiments, the neural network is a convolutional neural network.

In some embodiments, the reasonable range of the difference value is [−0.5, +0.5].

In some embodiments, a certain amount of data pairs refer to the amount of the data pairs required to achieve a model prediction accuracy of more than 90%.

In some embodiments, the data size reaching a certain order of magnitude refers that the data size reaches an order of magnitude of "thousands" or more.

The disclosure further provides a device for controlling smart home, and the device for controlling smart home includes a database building component, a user demand predicting component and a decision-making component.

The database building component is configured to build a demand database and a habit database of a user for home appliances.

The user demand predicting component is configured to, according to the demand database, train a demand model of the user by using a neural network, and predict a user demand.

The decision-making component is configured to, according to the habit database and a prediction regarding the user demand, determine an optimal home appliance execution policy conforming to the habits of the user by using a probability statistical algorithm, and intelligently control the corresponding home appliances.

In some embodiments, the device for controlling smart home further includes a user habit correcting component, and the user habit correcting component is configured to correct a bad habit of the user by the control method based on the value iteration function.

Compared with an existing technology, the method for controlling smart home and the device for controlling smart home of the disclosure have the following advantages.

The above technical features may be combined in various technically feasible modes to produce a new implementation scheme, as long as the purpose of the disclosure may be achieved.

BRIEF DESCRIPTION OF THE DRAWINGS

The disclosure is described in more detail below based on only non-defining embodiments and with reference to drawings. Herein.

DETAILED DESCRIPTION OF THE EMBODIMENTS

Figure 1:
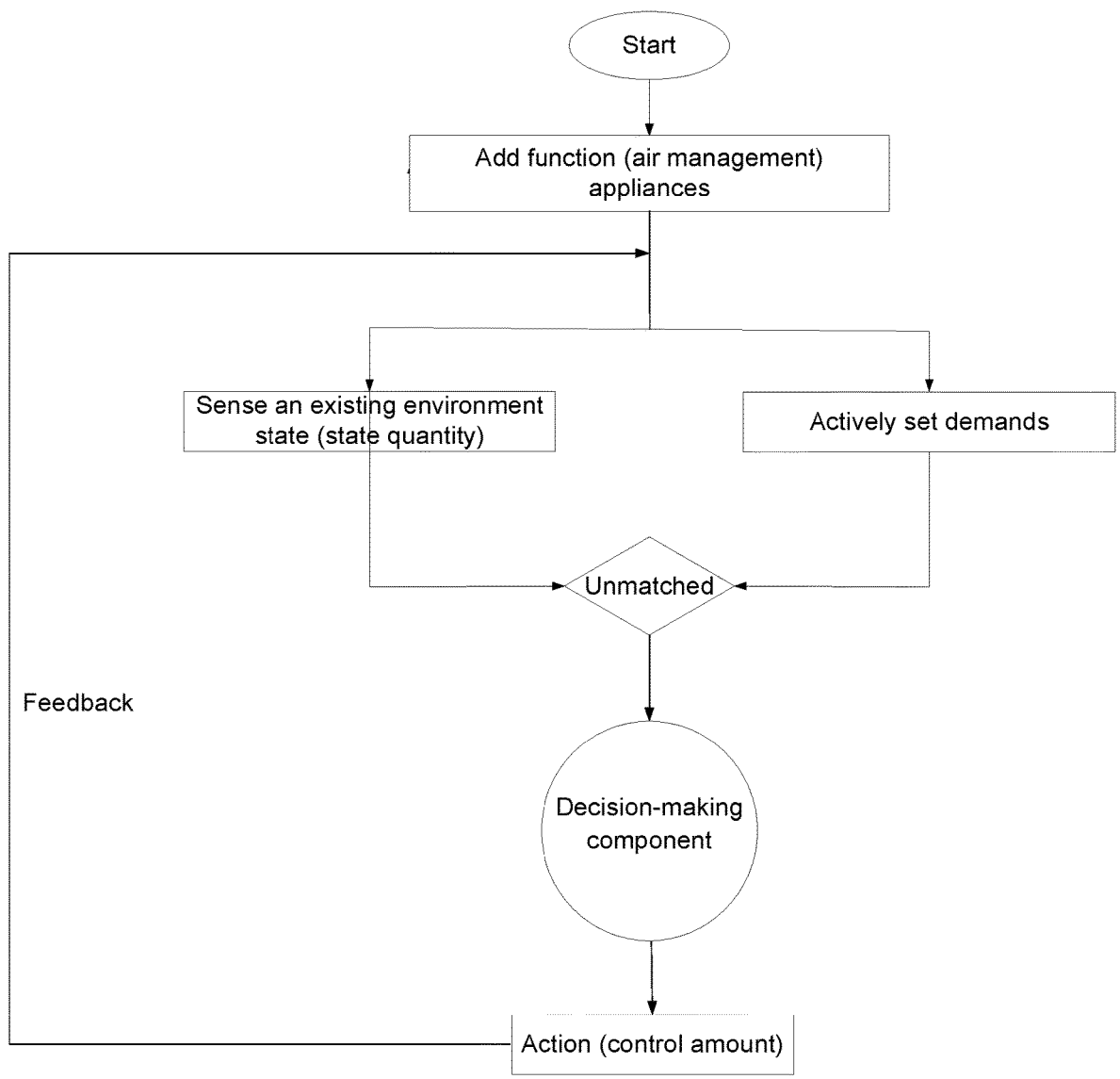
FIG. 1 shows a flow diagram of a method for controlling smart home of an embodiment of the disclosure.
Figure 2:
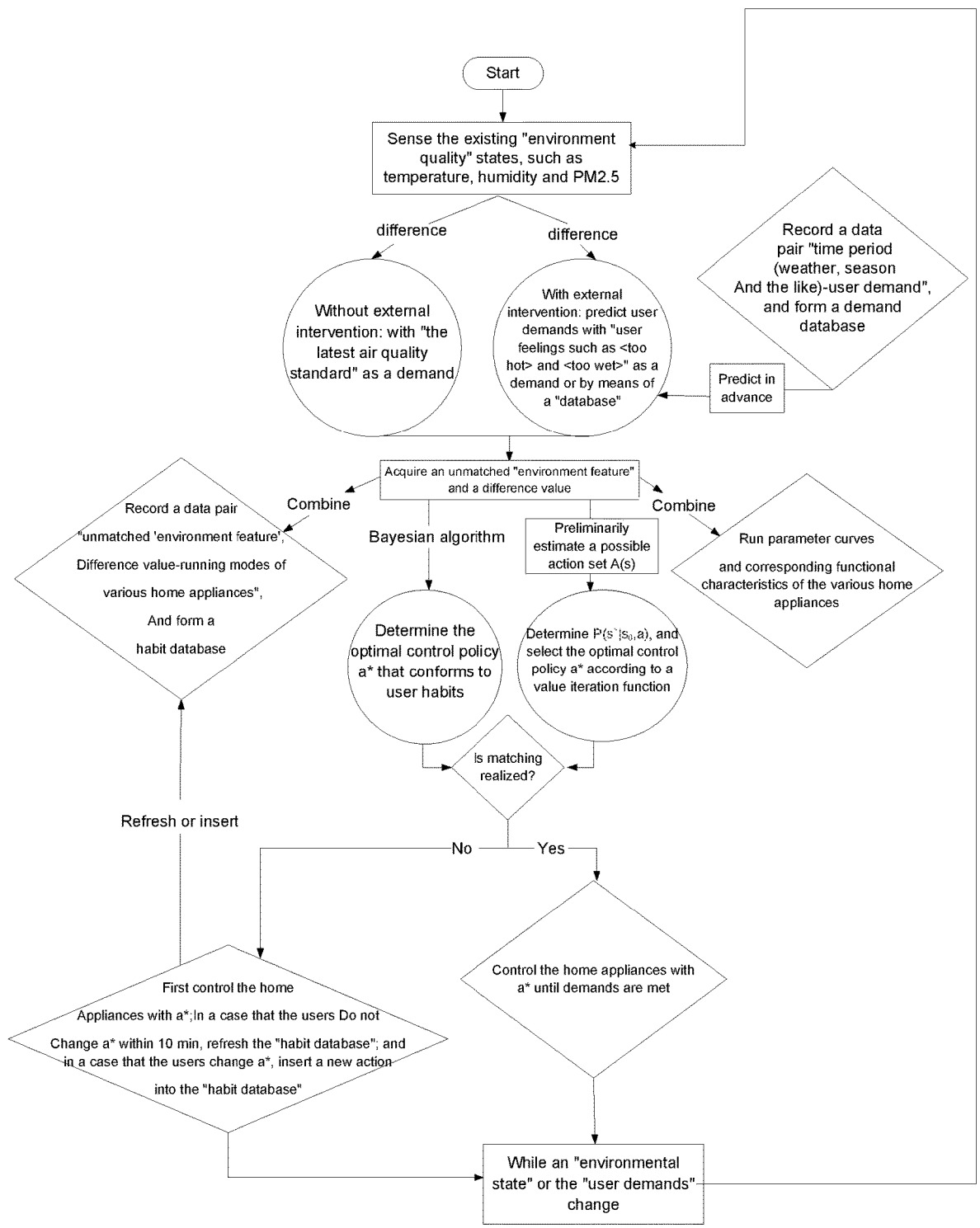
FIG. 2 shows a flow diagram of a decision-making component algorithm in the method for controlling smart home of an embodiment of the disclosure.

The disclosure is further described in detail below in combination with drawings and specific embodiments of the description. It should be noted that, as long as there is no conflict, each embodiment in the disclosure and each feature in each embodiment may be combined with each other, and technical schemes formed are all within a scope of protection of the disclosure.

The method for controlling smart home of the embodiments of the disclosure includes the following steps.

S101. According to demand and operation of a user, a demand database and a habit database of the user for home appliances are built.

S102. According to the built demand database, demand models of different users are trained by using a neural network, and the demands of the users during different periods of time are predicted; and the neural network here may be any neural networks. Preferably, the neural network selects a convolutional neural network.

S103. According to the built habit database and a prediction regarding the demands of the users, a home appliance execution policy conforming to the habits of the users are output by using a probability statistical algorithm, and the corresponding home appliances are controlled in advance. Preferably, the probability statistical algorithm may select a Bayesian algorithm.

The method for controlling smart home of the disclosure introduces the user demand and user habits into the control of the home appliances, uses the currently popular neural network to predict the user demand, and uses the Bayesian algorithm to output the control policy that conforms to the user habits on the basis of the user habits, and then the indoor environment is improved in advance, as to enhance the intelligence of the daily home life; and at the same time, the control method based on the value iteration function and the method based on the daily habits are corrected mutually, as to achieve a purpose of restraining the bad habit of the user.

Alternatively, the home appliances include but are not limited to: a (smart) air conditioner, a (smart) humidifier, a (smart) dryer and other smart home appliances.

Alternatively, S103 includes:

S1031. In the case without external intervention, according to a latest indoor air quality standard (namely a state variable of an existing environment related to air quality) read after the home appliances are connected to the Internet, it is calculated whether a relevant state content is matched, and unmatched state feature and difference value are determined as an algorithm input of a decision-making component, and at the same time policy matching is performed in the habit database, in a case that a corresponding policy exists, the corresponding policy is executed and it goes to S1036, in a case that the corresponding policy does not exist, then S1032 is executed.

Alternatively, the state variable related to the air quality includes but is not limited to parameters such as a temperature, humidity, PM2.5 (Particulate Matter with an aerodynamic equivalent diameter of less than or equal to 2.5 micrometers), a VOC (Volatile Organic Compounds) concentration, and a CO2 value.

Alternatively, determining whether the relevant state content is matched refers to judging whether each air quality feature is consistent, for example: the existing indoor temperature is 25° C., and a general air standard temperature is 22° C., a difference of 3 degrees between the two is beyond a reasonable error range, it may be determined that the "temperature" is an unmatched variable. The executed corresponding policy refers to a control measure that each relevant home appliance needs to adopt in order to change this unmatched state.

Alternatively, the tolerance is defined as a reasonable difference range. Preferably, while an equivalent value change range is within [−0.5, +0.5], it is regarded as the reasonable difference range.

S1032. The unmatched state feature is used to obtain a list of the home appliances that may adjust this feature in an existing environment and a state feature change rate of different policies thereof, the difference value is combined to specify a possible action set A(s) and it goes to S1035.

Alternatively, S1032 further includes:

A least square method is used to fit operating parameters of the home appliances in the early stage, as to obtain operating curves of the different policies in the corresponding environment.

Derivation is performed on the operating curves to obtain the state feature change rate and it is updated intermittently.

The difference value is combined to specify the possible action set A(s) and it goes to S1035.

Alternatively, the state feature change rate refers to a speed at which the home appliance changes the state feature in each control state, the possible action set A(s) is a variable, and the variable may change with the different home appliances.

S1033. In the case with the external intervention, for example user intervention or demand change, based on obtained user demand information, such as an existing feedback of "hot", "tide", "cold" and the like received, the unmatched state feature and the difference value are determined as an algorithm input, and it goes to S1032.

S1034. The existing time period (weather, season and the like)-demand information is stored in real time. While the data pair reaches a certain amount, the neural network, preferably the convolutional neural network, is used to predict the user demand and adjust the indoor air quality in advance; and herein, a certain amount of the data pairs refer to the amount of the data pairs required to achieve a model prediction accuracy of more than 90%.

S1035. Based on a value iteration function, an optimal policy a* is output to intelligently control the corresponding home appliances.

Since in an actual environment, P (s'|s_0, a)=1 under a normal operation of a device, it is based on the value iteration function:

U(s)=R(s_0)+γ*maxΣ_s·P(s'|s_0,a)*U(s')=R(s_0)+γ☐max [U_a(s')], it is known that an optimal decision depends on state utility $U_a(s')$, namely an expected value of the sum of discounted returns obtained in a process sequence, and the continuity of a control variable s with time is combined:

$$U_a(s') = E\left[\sum_{t=0}^{\infty} \gamma^t * R(s_t)\right] = \frac{1}{t}\int_0^t \gamma^t * R(s_t), R(s_t) = \frac{1}{|s'-s_t|}.$$

The policy a* that maximizes $U_a(s')$ is selected from the above formula as the algorithm output, as to intelligently control the corresponding home appliances, herein $R(s_t)$ is determined by the following formula:

$$R(s_t) = \frac{1}{|s'-s_t|}.$$

Herein, s' is a demand state, $s_t$ is an existing state, a∈ A(s), and γ is a discount factor, generally 0.8.

S1036. It is determined whether the executed policy is matched with the user demand, and the user evaluates a good and bad degree of the executed policy, in a case that a feedback of actively changing the policy by the user is not received within a period of time (for example, the user does not actively change the policy within 10 min), the habit database is refreshed, and in a case that the feedback of actively changing the policy by the user is received (for example, the user actively changes the policy), a received new policy is stored in the habit database. While the data size of the habit database reaches a certain order of magnitude, the probability statistical algorithm, such as the Bayesian algorithm, is used to analyze the database to learn a behavior habit Γ of the user, and a decision-making recommendation is made for the user based on Γ.

The embodiments of the disclosure further provides a device for controlling smart home, and the device for controlling smart home includes a database building component, a user demand predicting component, a decision-making component, and a user habit correcting component.

The database building component is configured to, according to demand and operation of a user, build a demand database and a habit database of the user for home appliances.

Alternatively, the home appliances include but are not limited to: a (smart) air conditioner, a (smart) humidifier, a (smart) dryer and other smart home appliances.

The user demand predicting component is configured to, according to the demand database, train a demand model of the user by using a neural network, and predict a user demand; and the neural network here may be any neural networks. Preferably, the neural network selects a convolutional neural network.

The decision-making component is configured to, according to the habit database and a prediction regarding the user demand, determine an optimal home appliance execution policy conforming to the habits of the user by using a probability statistical algorithm, and intelligently control the corresponding home appliances. Preferably, the probability statistical algorithm is a Bayesian algorithm.

Alternatively, in the case without external intervention, the decision-making component may calculate whether a relevant state content is matched according to a latest indoor air quality standard (namely a state variable of an existing environment related to air quality) read after the home appliances are connected to the Internet, and determine unmatched state feature and difference value as an algorithm input of the decision-making component, and perform policy matching in the habit database at the same time.

In a case that a corresponding policy exists, the corresponding policy is executed to intelligently control the corresponding home appliances.

In a case that the corresponding policy does not exist, or in the case with the external intervention, the decision-making component uses the unmatched state feature to obtain a list of the home appliances that may adjust this feature in an existing environment and a state feature change rate of different policies thereof.

The difference value is combined to specify a possible action set A(s) and based on a value iteration function, the optimal policy a* is executed to intelligently control the corresponding home appliances.

After the policy is executed, the decision-making component may determine whether the executed policy is matched with the user demand.

In a case that a feedback of actively changing the policy by the user is not received within a period of time (for example, the user does not actively change the policy within 10 min), the decision-making component may refresh the habit database, and in a case that the feedback of actively changing the policy by the user is received (for example, the user actively changes the policy), the decision-making component may store a received new policy in the habit database.

While the data size of the habit database reaches a certain order of magnitude (the amount of data pairs required to make the model prediction accuracy reach more than 90%), the decision-making component may uses the probability statistical algorithm, such as the Bayesian algorithm, to analyze the database to learn a behavior habit Γ of the user, and make a decision-making recommendation for the user based on Γ after that.

The user habit correcting component may mutually correct the control method based on the value iteration function and the user daily habits, and correct a bad habit of the user. The method for controlling smart home of the disclosure introduces the user demand and user habits into the control of the home appliances, uses the currently popular neural network to predict the user demand, and improves the intelligence of the daily home life; and at the same time, the control method based on the value iteration function and the method based on the daily habits are corrected mutually, as to achieve a purpose of restraining the bad habit of the user.

Although real-time operations of the disclosure are described in a specific order in the drawings, this is not intended or implies that these operations must be performed in the specific order, or that all the operations shown must be performed to achieve a desired result. Some steps may be omitted, a plurality of steps may be combined into one step, or one step may be divided into a plurality of steps for execution.

In addition, although the embodiments disclosed in the disclosure are as described above, the content described is only the embodiments adopted to conveniently understand the disclosure, and is not intended to limit the disclosure. Any persons skilled in the technical field to which the disclosure belongs may make any modifications and changes in the form and details of the implementation without departing from the spirit and scope disclosed in the disclosure. However, a scope of patent protection of the disclosure is still subject to a scope defined by the appended claims.

What is claimed is:

1. A method for controlling smart home, comprising the following steps:
    building a demand database and a habit database of a user for home appliances;
    according to the built demand database, training demand models of different users by using a neural network, and predicting the demands of the users during different periods of time; and
    according to the built habit database and a prediction regarding the demands of the users, outputting a home appliance execution policy conforming to the habits of the users by using a probability statistical algorithm, and controlling the corresponding home appliances in advance;
    wherein according to the prediction regarding the demands of the users and the built habit database, determining the optimal home appliance execution policy conforming to the habits of the users by using the probability statistical algorithm, and controlling the corresponding home appliances in advance, comprising:
        in a case without external intervention, according to a latest indoor air quality standard read after the home appliances are connected to the Internet, determining whether the relevant state content is matched and determining unmatched state feature and difference value as an algorithm input, and performing policy matching in the habit database;
        in a case that a corresponding policy exists, executing the corresponding policy to intelligently control the corresponding home appliances;
        in a case that the corresponding policy does not exist, using the unmatched state feature to obtain a list of the home appliances that can adjust this feature in an existing environment and a state feature change rate of policies thereof; and
        combining the difference value to specify a possible action set A(s) and based on a value iteration function, executing an optimal policy to intelligently control the corresponding home appliances.

2. The method for controlling smart home as claimed in claim 1, wherein according to the built habit database and the prediction regarding the demands of the users, determining the optimal home appliance execution policy conforming to the habits of the users by using the probability statistical algorithm, and controlling the corresponding home appliances in advance, further comprising:
    in the case with the external intervention,
    according to obtained user demand information, determining the unmatched state feature and difference value as the algorithm input;
    using the unmatched state feature to obtain the list of the home appliances that can adjust the state feature in the existing environment and the state feature change rate of the different policies thereof; and
    combining the difference value to specify the possible action set A(s) and based on the value iteration function, executing the optimal policy a* to intelligently control the corresponding home appliances.

3. The method for controlling smart home as claimed in claim 2, wherein according to the prediction regarding the demands of the users and the built habit database, determining the optimal home appliance execution policy conforming to the habits of the users by using the probability statistical algorithm, and controlling the corresponding home appliances in advance, further including: determining whether the executed policy is matched with the user demand;
    in a case that a feedback of actively changing the policy by the user is not received within a period of time, refreshing the habit database; and
    in a case that the feedback of actively changing the policy by the user is received, storing a received new policy in the habit database.

4. The method for controlling smart home as claimed in claim 3, wherein while the data size in the habit database reaches a certain order of magnitude, analyzing the habit database by using the probability statistical algorithm to learn a behavior habit Γ of the user, and making a decision-making recommendation for the user based on Γ.

5. The method for controlling smart home as claimed in claim 1, wherein using the unmatched state feature to obtain the list of the home appliances that can adjust the state feature in the existing environment and the state feature change rate of the policies thereof, comprising:

using a least square method to fit operating parameters of the home appliances in the early stage, as to obtain operating curves of the different policies in the corresponding environment;

performing derivation on the operating curves to obtain the state feature change rate and updating intermittently, wherein the state feature change rate refers to a speed at which the home appliance changes the state feature in each control state; and combining the difference value to specify the possible action set A(s) and based on the value iteration function, outputting the optimal policy to intelligently control the corresponding home appliances.

6. The method for controlling smart home as claimed in claim 4, wherein the probability statistical algorithm is a Bayesian algorithm.

7. The method for controlling smart home as claimed in claim 6, wherein the reasonable range of the difference value is [−0.5, +0.5].

8. A device for controlling smart home, comprising:
a database building component, configured to build a demand database and a habit database of a user for home appliances;
a user demand predicting component, configured to, according to the demand database, train a demand model of the user by using a neural network, and predict a user demand; and
a decision-making component, configured to, according to the habit database and a prediction regarding the user demand, determine an optimal home appliance execution policy conforming to the habits of the user by using a probability statistical algorithm, and intelligently control the corresponding home appliances;
the decision-making component, configured to, in a case without external intervention, according to a latest indoor air quality standard read after the home appliances are connected to the Internet, determining whether the relevant state content is matched and determining unmatched state feature and difference value as an algorithm input, and performing policy matching in the habit database; in a case that a corresponding policy exists, executing the corresponding policy to intelligently control the corresponding home appliances; in a case that the corresponding policy does not exist, using the unmatched state feature to obtain a list of the home appliances that can adjust this feature in an existing environment and a state feature change rate of different policies thereof; and combining the difference value to specify a possible action set A(s) and based on a value iteration function, executing an optimal policy to intelligently control the corresponding home appliances.

9. The device for controlling smart home as claimed in claim 8, further comprising a user habit correcting component, configured to correct a bad habit of the user by the control method based on the value iteration function.

* * * * *